(12) United States Patent
Hirschfeld

(10) Patent No.: US 7,924,550 B2
(45) Date of Patent: Apr. 12, 2011

(54) MULTIPHASE LINE FUSE MODULE

(75) Inventor: Thomas Hirschfeld, Burgthann (DE)

(73) Assignee: Siemens Aktiengesellschaft, München (DE)

( * ) Notice: Subject to any disclaimer, the term of this patent is extended or adjusted under 35 U.S.C. 154(b) by 124 days.

(21) Appl. No.: 12/518,580

(22) PCT Filed: Oct. 19, 2007

(86) PCT No.: PCT/EP2007/061188
§ 371 (c)(1),
(2), (4) Date: Jun. 10, 2009

(87) PCT Pub. No.: WO2008/071492
PCT Pub. Date: Jun. 19, 2008

(65) Prior Publication Data
US 2010/0008023 A1  Jan. 14, 2010

(30) Foreign Application Priority Data

Dec. 11, 2006 (DE) .......................... 10 2006 058 328

(51) Int. Cl.
*H02B 1/26* (2006.01)
*H02B 1/20* (2006.01)
(52) U.S. Cl. ........ 361/641; 361/611; 361/622; 361/624; 361/648; 307/147
(58) Field of Classification Search .................. 361/614, 361/624, 637, 641, 648; 200/50.27; 307/147; 174/68.2, 70 B, 71 B, 72 B, 88 B, 99 B, 129 B, 174/133 B, 149 B
See application file for complete search history.

(56) References Cited

U.S. PATENT DOCUMENTS

| | | |
|---|---|---|
| 5,148,139 A | 9/1992 | Dingle |
| 2010/0025105 A1* | 2/2010 | Hirschfeld ................ 174/72 B |

FOREIGN PATENT DOCUMENTS

| | | |
|---|---|---|
| DE | 93 03 886 U1 | 6/1993 |
| DE | 195 11 350 A1 | 10/1996 |
| DE | 102 05 101 A1 | 8/2003 |
| DE | 10 2004 013 477 A1 | 10/2005 |
| EP | 0 013 963 A1 | 8/1980 |
| EP | 0 171 060 A1 | 2/1986 |
| EP | 0 944 145 A1 | 9/1999 |
| EP | 0 883 888 B1 | 2/2000 |
| WO | WO 02/47226 A1 | 6/2002 |

OTHER PUBLICATIONS

English machine translation of Knippert, German publication DE 10205101 A1, Published Aug. 21, 2003, translated on Dec. 1, 2010.*
Siemens-Katalog D11 SINAMICS G150—Umrichter-Schrankgeräte; Others; 2002; DE.

* cited by examiner

*Primary Examiner* — Robert J Hoffberg
(74) *Attorney, Agent, or Firm* — Henry M. Feiereisen; Ursula B. Day

(57) ABSTRACT

The invention relates to a multiphase line fuse module. According to the invention, said multiphase line fuse module comprises a busbar pack (32), interposed between two supporting plates (16, 42), at least one line fuse (52, 66) with an associated AC contactor (54) per phase, said phase assemblies being arranged one on top of the other in front on a small face of the busbar pack (32) having connections (56, 58) on the small face and being electrically connected to the small face connections (56, 68), and a cover closing the phase assemblies on the front side. The invention thus provides a space-saving system for line fuses (52, 66), AC contactors (54) and busbars in one housing, thereby allowing an easy replacement of the wearing parts.

11 Claims, 6 Drawing Sheets

US 7,924,550 B2

MULTIPHASE LINE FUSE MODULE

CROSS-REFERENCES TO RELATED APPLICATIONS

This application is the U.S. National Stage of International Application No. PCT/EP2007/061188, filed Oct. 19, 2007, which designated the United States and has been published as International Publication No. WO 2008/071492 and which claims the priority of German Patent Application, Serial No. 10 2006 058 328.0, filed Dec. 11, 2006, pursuant to 35 U.S.C. 119(a)-(d).

BACKGROUND OF THE INVENTION

The invention relates to a polyphase line protection module.

FIG. 1 shows a circuit diagram for the polyphase connection of line protection devices 2 with associated AC contactors 4, in relatively great detail. In order to allow these series circuits, in each case comprising a line protection device 2 and an AC contactor 4, to be connected to other electrical units, an AC supply line 6 and an AC output line 8 are provided per phase. Each line protection device 2 is electrically conductively connected by means of a connecting line 10 to an AC supply line 6 and by means of a further connecting line 12 to the associated AC contactor 4. Each AC contactor 4 is also electrically conductively connected by means of a further connecting line 14 to an AC output line 8.

When a circuit diagram such as this is implemented, the line protection devices 2, the AC contactors 4 and the AC supply and output lines 6 and 8 have until now been accommodated in a housing or switchgear cabinet, with holders being provided for the attachment of the components. In order to maintain the air gaps and creepage distances, these components are arranged at appropriate distances from one another within this housing. This arrangement of these components results in the demand for space within a housing or switchgear cabinet being very high. Furthermore, the assembly effort is quite high since these components are wired up individually. During this process, wiring errors can occur which are discovered only as a result of a short circuit during the commissioning of an electrical unit connected to these contactors 4.

SUMMARY OF THE INVENTION

The invention is now based on the object of the components being connected such that the disadvantages mentioned above no longer occur.

According to the invention, this object is achieved by providing a polyphase line protection module. According to the invention, this line protection module has the known components from the circuit diagram shown in FIG. 1, although they are accommodated in a module housing of simple design. For this purpose, the AC supply and output lines 6 and 8, which are each in the form of busbars, are stacked to form a busbar pack with connections on the end and narrow faces. The components of one phase are arranged one above the other to form a phase assembly, with these phase assemblies on the one hand being arranged one above the other in front of a narrow face of the busbar pack, where the narrow-face connections are located. In order to allow components of each phase to be arranged in the stated physical arrangement with respect to the busbar pack, two mounting panels are provided, which are detachably connected to the busbar pack. In order to prevent anybody from being able to touch parts of this line protection module according to the invention, this module has a plurality of covers on the front face.

This line protection module according to the invention has a width which corresponds to the width of the busbar pack. Furthermore, the line protection devices and the AC contactors are accommodated in a space-saving manner in a housing. This line protection module can be produced separately and can be tested for wiring errors separately. This line protection module is therefore used as a tested unit in an electrical unit. A further advantage of this line protection module is that failed components in one phase of this line protection module can be replaced by serviceable components with little effort.

Advantageous refinements of this polyphase line protection module are specified in the dependent claims.

BRIEF DESCRIPTION OF THE DRAWING

The invention will be explained further with reference to the drawing, which schematically illustrates one embodiment of a polyphase line protection module according to the invention, and in which.

DETAILED DESCRIPTION OF PREFERRED EMBODIMENTS

This is one of two applications both filed on the same day. Both applications deal with related inventions. They are commonly owned and have the same inventive entity. Accordingly, reference is made to the U.S. patent application, entitled "BUSBAR PACK".

Figure 2:
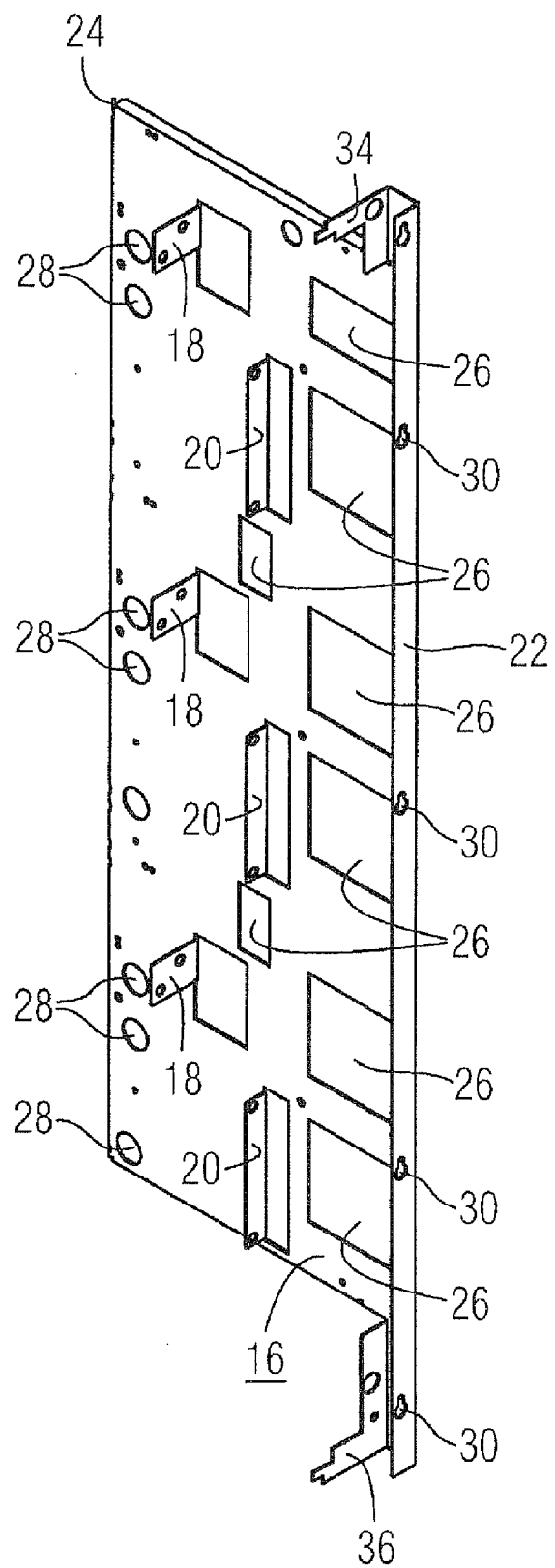
FIG. 2 shows a perspective view of a mounting panel, from the left, of a polyphase line protection module according to the invention.

FIG. 2 shows a perspective view of a mounting panel 16 of a polyphase line protection module according to the invention. This mounting panel 16 is the left-hand mounting panel of the module according to the invention. This mounting panel 16 has a plurality of attachment tabs 18 and 20 which are created from the plane of the mounting panel 16 by bends. In addition, this mounting panel 16 has a rearward attachment tab 22 and a front-face attachment tab 24. These attachment tabs 22 and 24 are likewise created from the mounting panel 16 by bends. Furthermore, this mounting panel 16 also has apertures 26 and holes 28. The apertures 26 are used for ventilation of the busbar pack 32, with the holes 28 being used for the wiring. In order to allow this polyphase line protection module to be attached to a motherboard of an electrical unit, the rearward attachment tab 22 has at least two holes 30. In order to fix a busbar pack 32 of the polyphase line protection module, this mounting panel has a part 34 and a part 36 at the top and bottom of an upper and lower transverse strut 38 and 40 of the polyphase line protection module.

Figure 3:
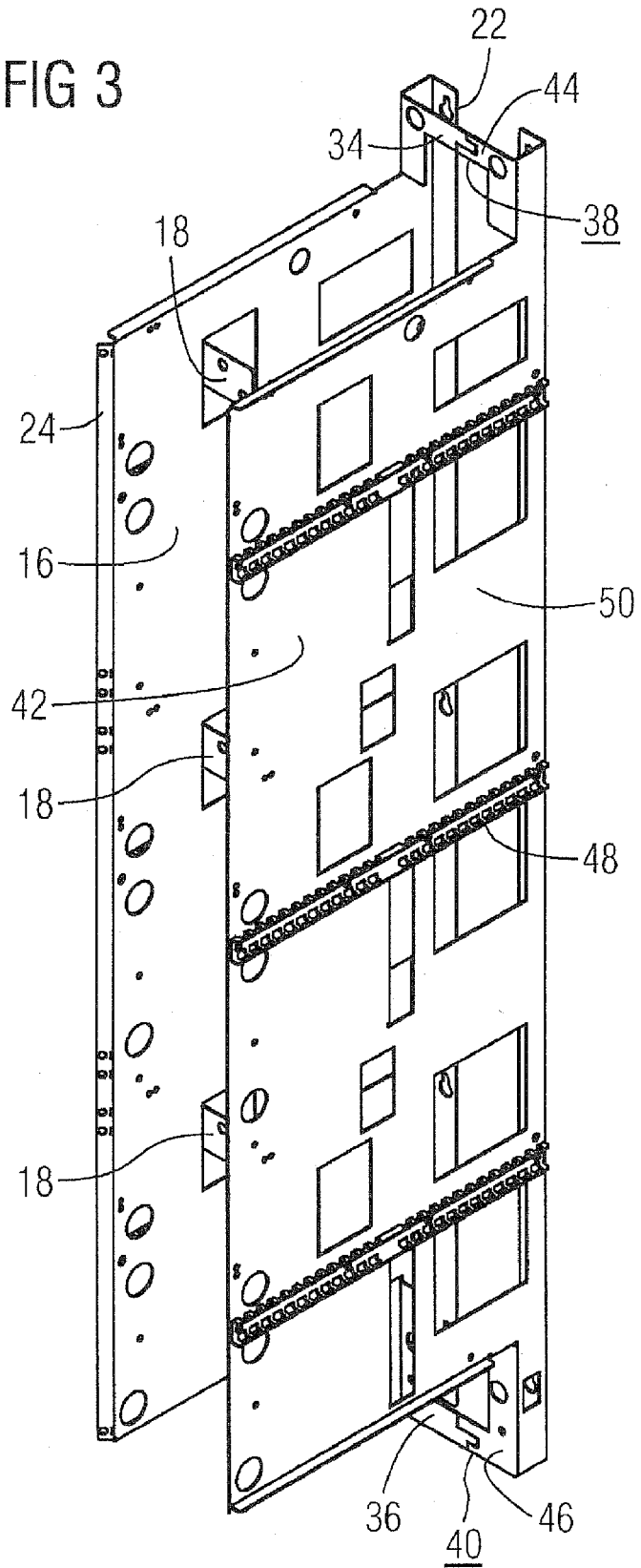
FIG. 3 shows a perspective view of two mutually associated mounting panels of a polyphase line protection module according to the invention.

FIG. 3 illustrates only the two mounting panels 16 and 42, in perspective form, of the polyphase line protection module according to the invention. The right-hand mounting panel 42 is designed to be identical to the mounting panel 16. This illustration also shows the upper and lower rearward transverse struts 38 and 40. These upper and lower transverse struts 38 and 40, respectively, comprise two parts 34 and 44 as well as 36 and 46, respectively, which are designed such that they engage in one another in an interlocking manner when the polyphase line protection module is in the assembled state. As can be seen from this perspective view, the mounting panel 42 has reinforcing means 48, in the same way as the mounting panel 16. These reinforcing means 48 are arranged one above the other on a flat face 50 of the mounting panel 42. A U-profile, whose limb has a multiplicity of apertures, is provided as the reinforcing means 48.

Figure 1:
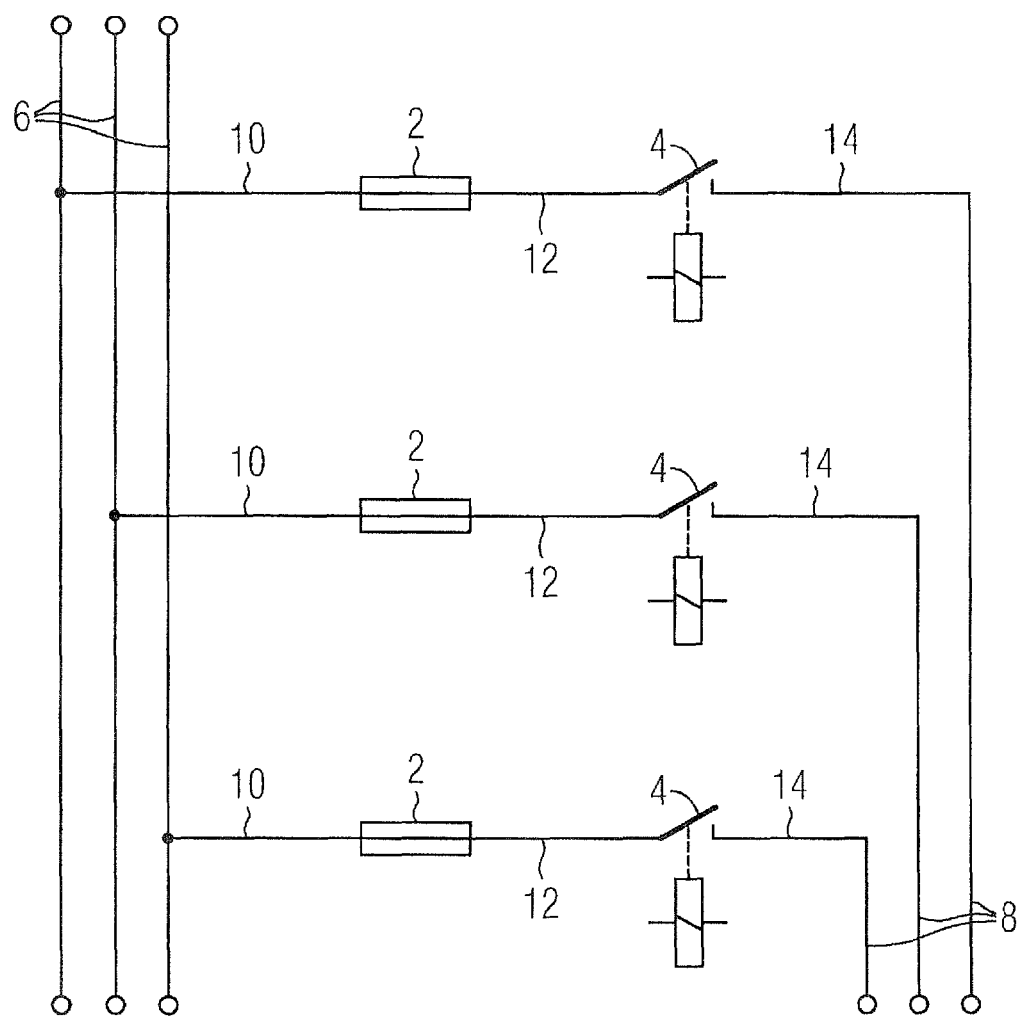
FIG. 1 shows a circuit diagram for the multipole connection of line protection devices with associated AC contactors.
Figure 4:
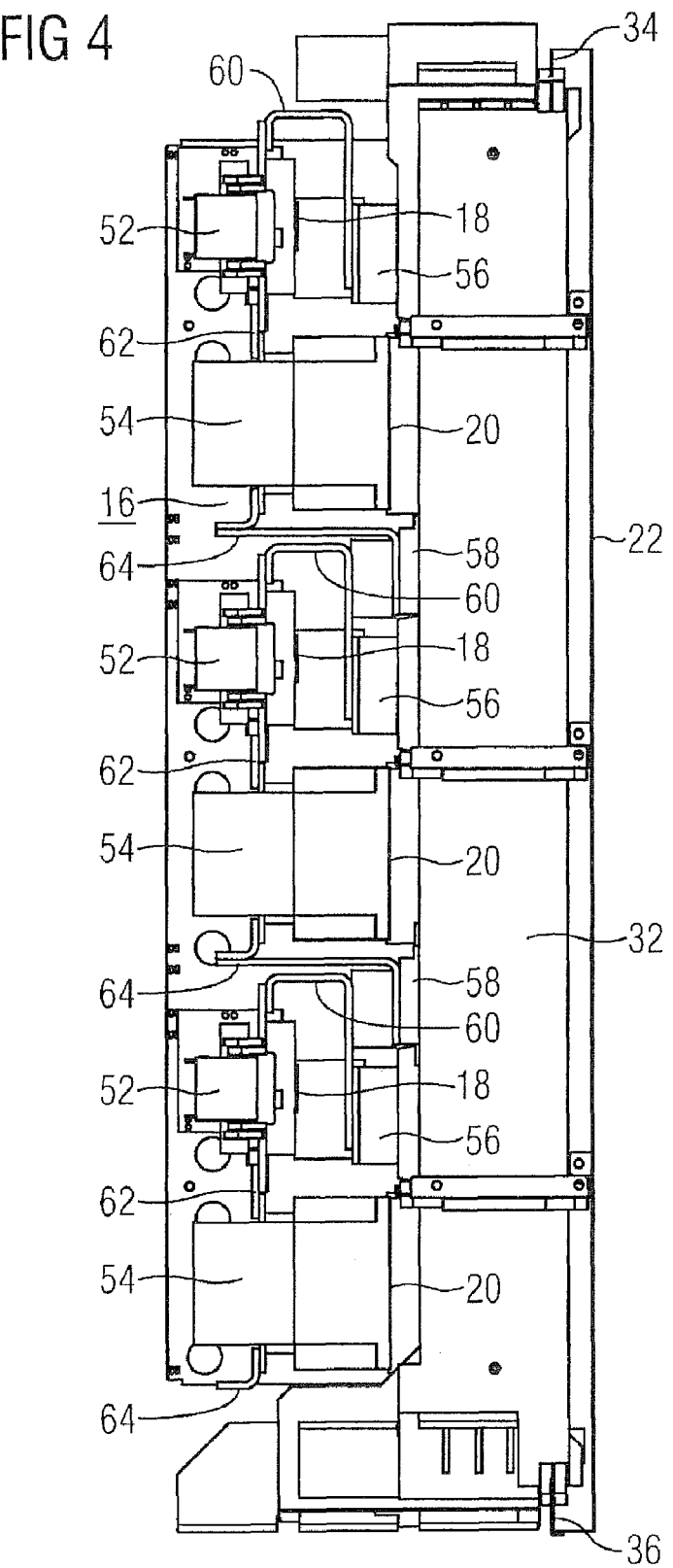
FIG. 4 shows a side view of a populated polyphase line protection module according to the invention, without a second mounting panel.

FIG. 4 shows a side view of a populated polyphase line protection module according to the invention, with the right-hand mounting panel 42 having been removed. This side view shows a busbar pack 32 and a line protection device 52 with an associated AC contactor 54 of each phase assembly. In this polyphase line protection module, three phase assemblies are arranged one above the other in front of a narrow face of the busbar pack 32. This narrow face of the busbar pack 32 has a plurality of narrow-face connections 56 and 58. One connection of a protection device 52 is in each case connected to the connections 56 while, in contrast, one connection of an AC contactor 54 is connected to the connection 58. In order to electrically conductively connect one protection device 52 in each case to one narrow face connection 56, connecting lines 10 are provided as shown in FIG. 1. Busbar pieces 60 are used as connecting lines 10. According to FIG. 1, a line protection device 2 and an associated AC contactor 4 are electrically connected to one another in series by means of a further connecting line 12. This further connecting line 12 is provided by a busbar piece 62 in the polyphase line protection module. The electrical connection of an AC contactor 4 to an AC output line 8 is produced in a corresponding manner to the circuit diagram shown in FIG. 1 by means of a further connecting line 14. This connecting line 14 is likewise provided by a busbar piece 64 in FIG. 4.

Figure 5:
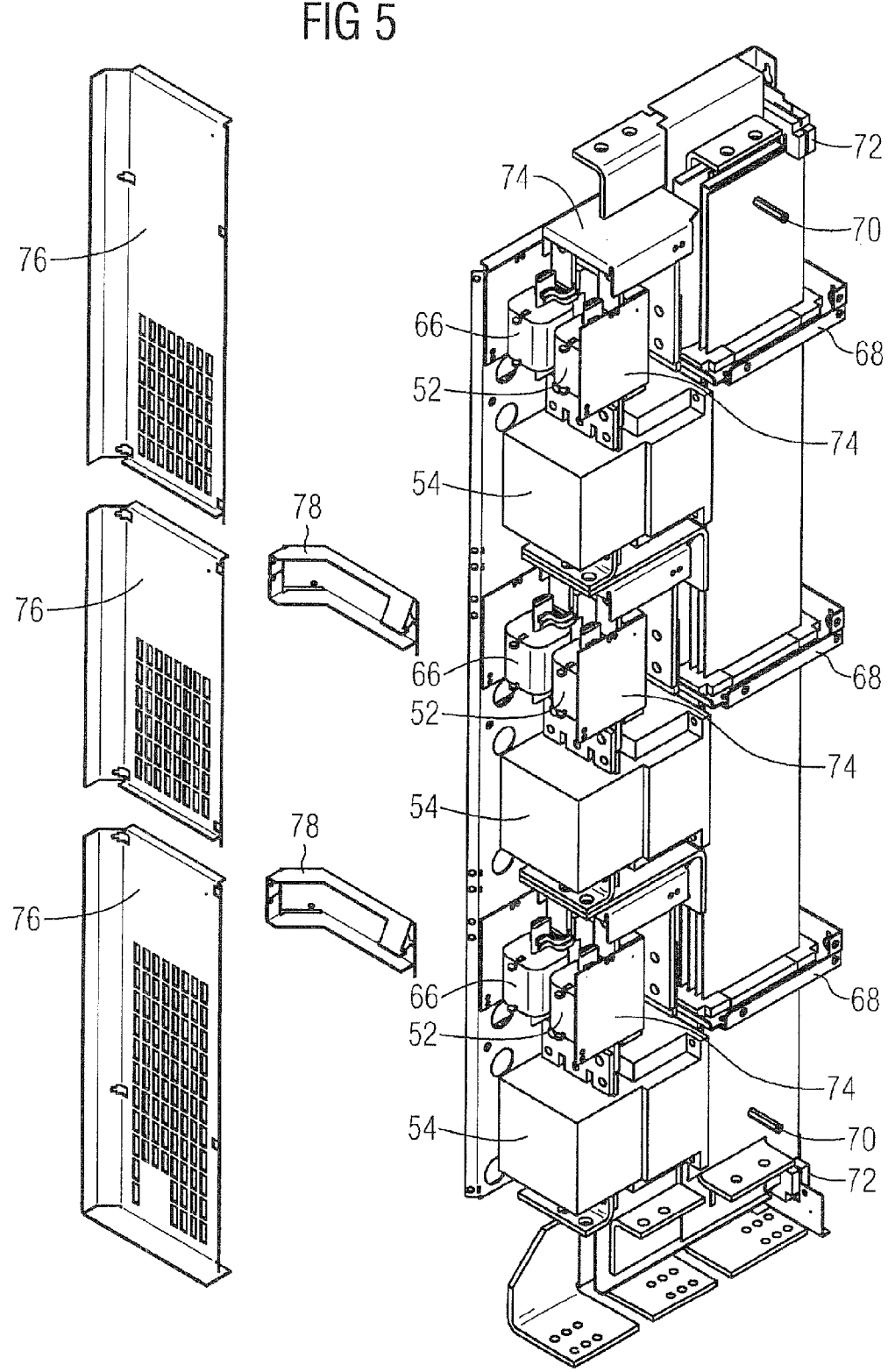
FIG. 5 shows this populated polyphase line protection module as shown in FIG. 4 in perspective, with covers and reinforcing means additionally being provided on the front face.

FIG. 5 shows a perspective illustration of the populated polyphase line protection module as shown in FIG. 4. As can be seen from this illustration, two protection devices 52 and 66 are provided as the line protection device 2, corresponding to the circuit diagram shown in FIG. 1, and are electrically connected in parallel. This means that the protection devices 66 are mechanically attached to the attachment tabs 18 of the mounting panel 16 while, in contrast, the protection devices 52 are mechanically attached to the attachment tabs 18 of the mounting panel 42. The attachment tabs 20 on both mounting panels 16 and 42 are required for mechanical attachment of the AC contactors 54.

Since the busbar pack 32 has been described in detail in the above-mentioned parallel co-filed U.S. patent application Ser. No. 12/518,567 (U.S. Patent Application Publication 2010/0025105), this busbar pack 32 will not be described at this point. In this illustration, this busbar pack 32 has three two-part apparatuses 68, which each comprise two U-shaped fastening brackets which engage in one another. Each of the two mounting panels 16 and 42 is detachably connected to this two-part apparatus 68.

In order to ensure that the upper and lower free ends of the bars of the busbar pack 32 cannot be moved by current forces, an upper and a lower space 70 are provided. Furthermore, an upper and a lower coupling element 72 are provided. These coupling elements 72 have a plurality of grooves which are located alongside one another and are designed such that the insulating bars in the busbar pack 32 can be plugged into them. The two coupling elements 72 are therefore each supported on the busbars of the busbar pack 32, by which means they are fixed in their position. It is therefore impossible for the busbars to slide within the busbar pack 32. Each coupling element 72 has a groove opposite these grooves in each coupling element 72. In the assembled state, the rearward respective transverse strut 38 or 40 of the two mounting panels 16 and 42 runs in this groove.

In order to make it possible to comply with the required air gaps and creepage distances, this polyphase line protection module has a plurality of devices 74 which are arranged between live parts at different potentials.

A plurality of covers 76, between each of which a reinforcing means 78 is arranged, are provided in order to ensure that the polyphase line protection module is a closed unit. These covers 76 are detachably connected to the front-face attachment tabs 24 of the mounting panels 16 and 42. These covers 76 each have an area with perforations in order to allow the components of the polyphase line protection module between the two mounting panels 16 and 42 to be cooled by means of environmental air (convection cooling).

Figure 6:
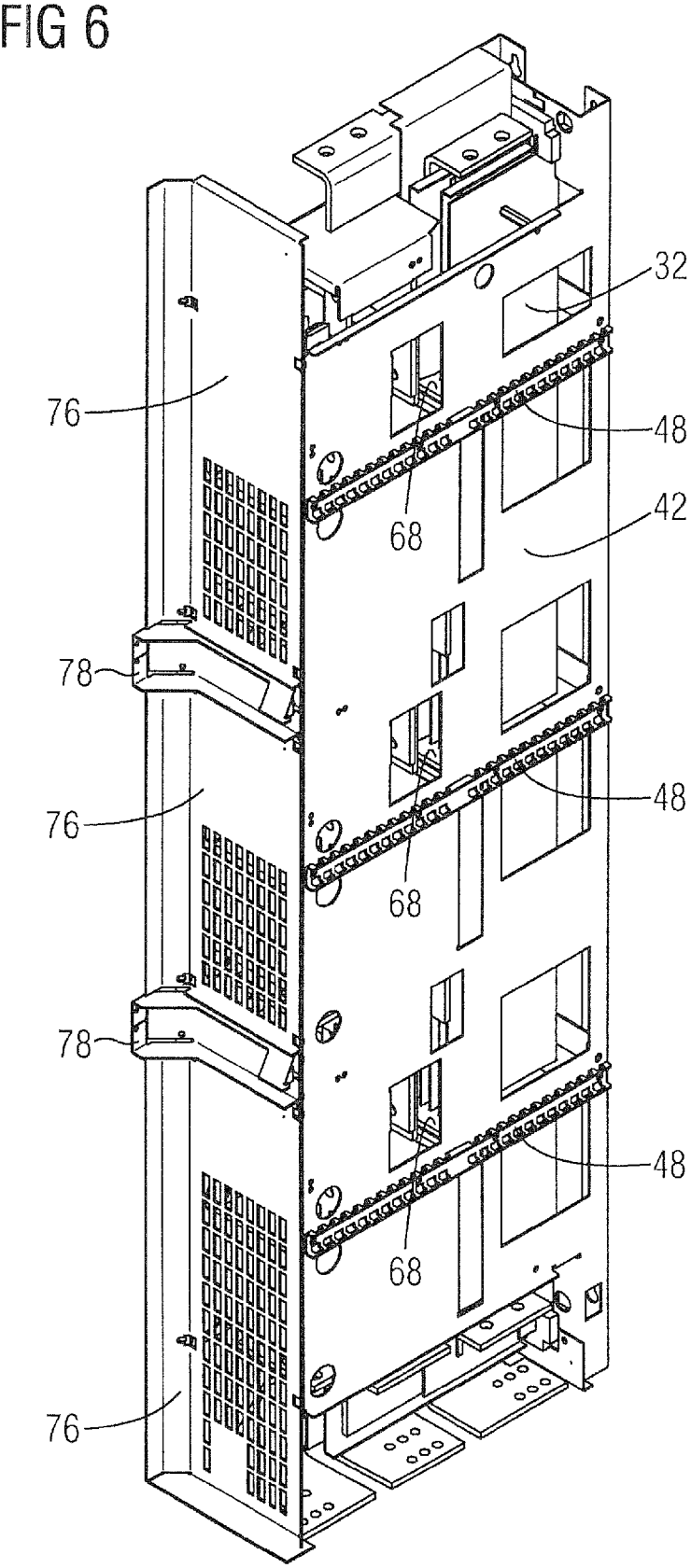
FIG. 6 shows a perspective view of a populated polyphyase line protection module according to the invention.

FIG. 6 shows a perspective illustration of an assembled polyphase line protection module. As can be seen from this illustration, the reinforcements 48 are arranged at the level of the two-part apparatus 68 of the busbar pack 32 on a flat face of the respective mounting panel 16 or 42. The connections of the AC supply line 6 are located in the upper and lower end surface of the polyphase line protection module. The connections of the AC output lines 8 are located on a plane which is parallel to the lower end surface of the polyphase line protection module and is above this end surface. This allows an electrical unit to be placed and wired up directly on the right hand side alongside this polyphase line protection module. The design according to the invention results in the polyphase line protection module being particularly narrow. The line protection module illustrated in FIG. 6 has a width, for example, of 200 mm and a height, for example, of 1754 mm.

The advantages of this polyphase line protection module according to the invention are the highly space-saving arrangement of protection devices 2 and 52, 66, contactors 4 and 54 and busbars for relatively high currents in one housing, in which case this module can be separately assembled and tested. Furthermore, parts that are subject to wear (protection devices, contactors) can be replaced with little effort.

What is claimed is:

1. A polyphase line protection module comprising:
   two mounting panels;
   a plurality of phase assemblies, wherein each of the plurality of phase assemblies comprises an AC contactor and at least one line protection device, with the at least one line protection device and an AC contactor for the each of the plurality of phase assemblies being arranged on top of each other;
   a bursar pack comprises
   a first busbar forming an AC supply line; and
   a second busbar forming an AC output line,
   wherein the busbar pack arranged between the two mounting panels, and the busbar pack having connections on respective end faces and narrow faces of the busbar pack; and
   a cover covering a front face of the plurality of phase assemblies,
   wherein the plurality of phase assemblies are arranged one above another in front of the connections on the narrow faces of the busbar pack and electrically conductively connected to the connections on the narrow faces of the busbar pack and wherein each of the two mounting panels is connected to a flat face of the busbar pack.

2. The polyphase line protection module of claim 1, wherein at least one of the two mounting panels comprises attachment tabs for attaching the at least one line protection device and the AC contactor of the each of the phase assemblies.

3. The polyphase line protection module of claim 1, wherein at least one of the two mounting panels comprises a rearward attachment tab with at least two holes.

4. The polyphase line protection module of claim 1, wherein at least one of the two mounting panels comprises an attachment tab for attaching the cover covering the front face of the plurality of phase assemblies.

5. The polyphase line protection module of claim 1, wherein the cover comprises a reinforcing means.

6. The polyphase line protection module of claim 1, wherein the cover covers the front face of the each of the plurality of phase assemblies.

7. The polyphase line protection module of claim 6, wherein the cover comprises a first cover covering the front face of a first phase assembly of the plurality of phase assemblies, a second cover covering the front face of a second phase assembly of the plurality of phase assemblies; and a reinforcing means arranged between the first and second covers.

8. The polyphase line protection module of claim 1, wherein at least one of the two mounting panels comprises a reinforcing means disposed on an outside flat face of the at least one of the two mounting panels.

9. The polyphase line protection module of claim 1, further comprising a coupling element having two sides and configured to fix a position of the busbar pack between the two mounting panels, said coupling element having a comb-like structure on a first side of the two sides and a groove on a second side of the two sides.

10. The polyphase line protection module of claim 1, further comprising partition devices arranged between the each of the plurality of phase assemblies for increasing air gaps and creepage distances between portions of the polyphase line protection module having different electrical potentials.

11. The polyphase line protection module of claim 1, wherein the two mounting panels are composed of metal.

\* \* \* \* \*

UNITED STATES PATENT AND TRADEMARK OFFICE
CERTIFICATE OF CORRECTION

PATENT NO.       : 7,924,550 B2  
APPLICATION NO.  : 12/518580  
DATED            : April 12, 2011  
INVENTOR(S)      : Hirschfeld Page 1 of 1

It is certified that error appears in the above-identified patent and that said Letters Patent is hereby corrected as shown below:

Column 4, claim 1, line 57: Replace "bursar" with --busbar--.

Signed and Sealed this
Thirty-first Day of May, 2011

David J. Kappos
*Director of the United States Patent and Trademark Office*